United States Patent [19]

Myrick

[11] 4,402,225
[45] Sep. 6, 1983

[54] PRESSURE TRANSMITTING APPARATUS

[76] Inventor: Alma L. Myrick, 2618 Hazel St., Texarkana, Ark. 75504

[21] Appl. No.: 272,954

[22] Filed: Jun. 12, 1981

Related U.S. Application Data

[63] Continuation-in-part of Ser. No. 121,683, Feb. 15, 1980, abandoned.

[51] Int. Cl.³ .............................................. G01L 7/16
[52] U.S. Cl. ................................ 73/706; 277/DIG. 6; 285/DIG. 19
[58] Field of Search ................. 73/706, 744, 745, 746; 277/DIG. 6, 177; 285/DIG. 19

[56] References Cited

U.S. PATENT DOCUMENTS 3,415,123 12/1968 Broughton ............................. 73/744
4,236,412 12/1980 Myrick .................................. 73/744

*Primary Examiner*—Donald O. Woodiel
*Attorney, Agent, or Firm*—Jacobi, Siegel, Presta, Marzullo & Aronson

[57] ABSTRACT

This invention provides a pressure transmitting and sealing apparatus between a high or low pressure fluid line and a gauge monitoring the pressure of the fluid in the line. This apparatus transmits pressure fluctuations between the measured fluid and a dissimilar fluid in the standline line connected to the measuring gauge. The invention is particularly applicable in instances where the ambient temperature is below the freezing point of the measured fluid and a non-freezing fluid is required in the standing line and gauge. The apparatus comprises an in-line piston and cylinder unit which transmits variations in the pressure in the measured line to the fluid in the standing line to the gauge, while maintaining separation of the two fluids and at the same time allowing the non-freezing fluid in the standing line to lubricate the piston and cylinder. In the event of a break in the standing line, the piston will prevent leakage from the measured fluid line. In one embodiment, O-rings are utilized around the piston that will resist very high temperatures in nuclear power plants, fossil fuel plants or the like.

7 Claims, 5 Drawing Figures

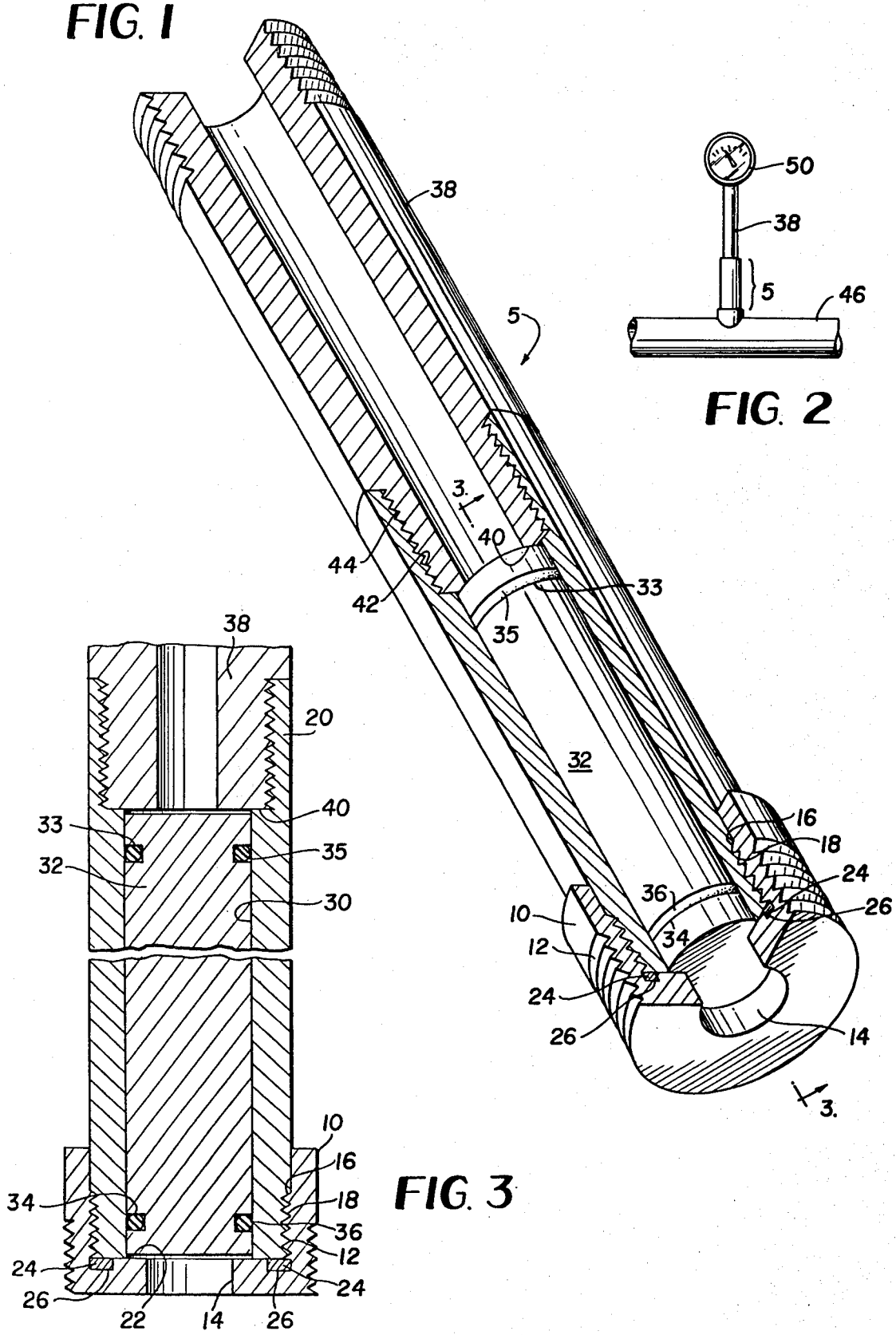

PRESSURE TRANSMITTING APPARATUS

CROSS-REFERENCE TO RELATED APPLICATION

This application is a continuation-in-part of application Ser. No. 121,683, filed on Feb. 15, 1980 and entitled "PRESSURE TRANSMITTING APPARATUS", now abandoned.

BACKGROUND AND SUMMARY OF THE INVENTION

In the petroleum industry, both for drilling operations and refining, pressurized fluids must be monitored continuously and temperatures below the freezing point of the flowing fluids are often encountered. The moving fluids resist freezing; however, the standing fluid in the lines to the monitoring gauges and in the gauges themselves often freeze since the fluid is essentially stationary. Various methods are employed to counteract this freezing in the standing lines. Heat strips are wrapped around the lines and gauges, warm water is sprayed on the lines and gauges, and other means are employed. Due to the high or low pressures that may be involved, e.g., from 10 PSI to 500 PSI, no satisfactory seal has previously been found which could separate the measured fluid from a non-freezing fluid which could be used in the standing line and monitoring gauge. The invention presented here eliminates these longstanding problems by providing a sealing piston which transmits the pressure variations of the measured fluid to a separate dissimilar fluid in the standing line and gauge which will not freeze at the temperatures encountered and will keep the two fluids substantially separated.

A bushing is provided which screws or other wise attaches to the pipe line, or a cut-off valve thereon, carrying the fluid to be monitored. This bushing is threaded on the inside to accommodate a piston cylinder. The piston cylinder is fitted into the bushing and a tight fitting piston made from any suitable material is slidably disposed within the cylinder. A thick walled pressure pipe with the end machined flat is screwed into the open end of the piston cylinder and provides a sealing surface against which the piston end may seat. The standing gauge pipe and gauge are filled with suitable non-freezing and lubricating fluid and sealed. The piston under pressure from the fluid to be monitored transmits the pressure to the fluid in the standing pipe and pressure gauge while substantially separating the two fluids at opposite ends of the piston. When there is no pressure in the monitored fluid pipe, the piston seats against the shoulder of the bushing to prevent the fluid in the standpipe and gauge from leaking.

In case of a break in the line between the piston and the gauge, the piston will prevent the leakage of fluid from the pipe line. Accordingly, the apparatus of the present invention serves also as a safety device.

In high temperature applications, the piston is provided with O-rings formed of Grafoil or the like that are disposed in circumferential bores near the ends thereof. Such O-rings can withstand temperatures up to 1,000° F. and are particularly useful in nuclear power or fossil fuel plants.

BRIEF DESCRIPTION OF THE DRAWING

FIG. 1 is a cutaway perspective view of the apparatus of this invention, illustrating the component parts and construction thereof;

FIG. 2 is an elevational view of the apparatus of the present invention installed on a pipeline in its relationship with a monitoring pressure gauge;

FIG. 3 is a sectional view taken along line 3—3 of FIG. 1;

DESCRIPTION OF THE PREFERRED EMBODIMENTS

Figure 4:
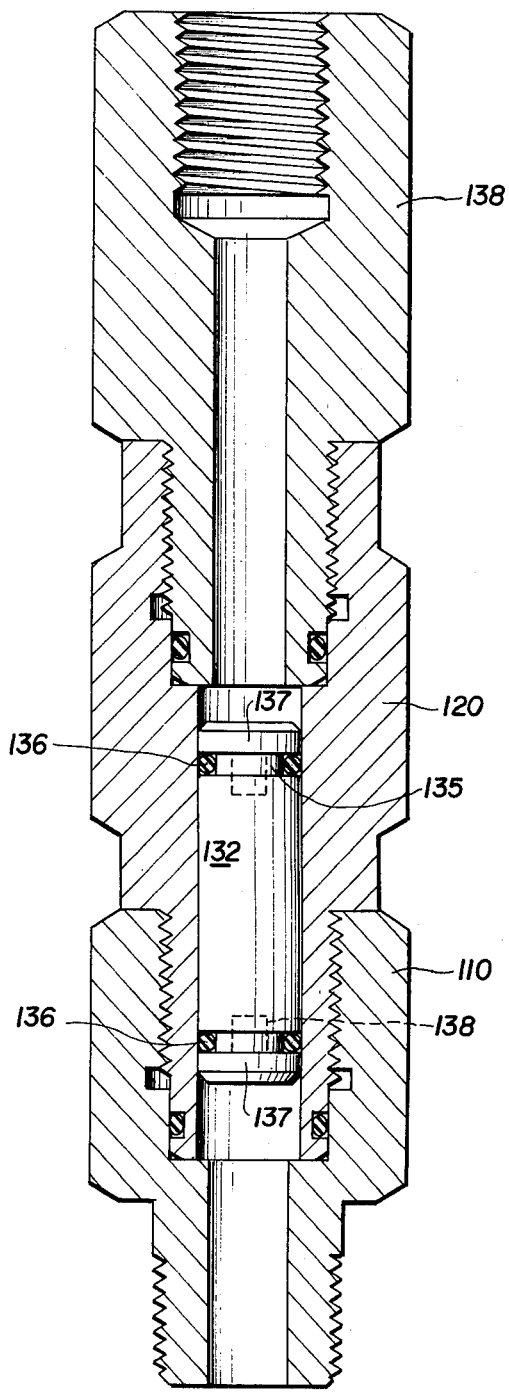
FIG. 4 is a side elevational view, with parts shown in section, of a second embodiment of the apparatus of the present invention.

Referring now to FIG. 1, the apparatus 5 of the present invention comprises a bushing 10 machined of steel or similar suitable material with male threads 12 provided to be screwed into a flow pipe or cut-off valve at the point where monitoring of the pressure is desired. The bushing is provided with a hole 14 which passes through the bushing 10. The interior of the bushing 10 is provided with female threads 16 which mate with the male threads 18 on a piston cylinder 20. The bushing 10 is provided with an interior shoulder 22 into which is machined or otherwise provided a groove 24 in the region contacted by the end of the piston cylinder 20 when the bushing 10 and sleeve 20 are screwed together. An O-ring 26 made of neoprene or other suitable material is fitted in the groove 24.

The piston cylinder 20 preferably is made of steel or other suitable materials of sufficient strength to withstand expected pressures or heat, and is machined on the inside to provide a smooth inner surface 30.

A piston 32, formed of stainless steel or any other suitable material, is slidably disposed within the cylinder 20 and is provided with a smooth outer surface. The outer diameter of the piston 32 is only slightly smaller than the inner diameter of the cylinder 20. As an illustrative example, the outer piston diameter may be only one-two thousandth of an inch smaller than the inner diameter of the cylinder. The piston 32 is provided with circumferential bores 33, 34 near the ends thereof in which 0-rings 35, 36 or other suitable means are mounted to provide an effective seal between the piston 32 and the cylinder 20.

A standpipe 38 or bushing is disposed at the opposite end of the cylinder 20 and is formed of a tube or pipe of any suitable material with thick walls and a shoulder 40 which abuts against a recessed annular shoulder 42 on the end of the cylinder 20. The standpipe 38 or bushing is secured to the cylinder 20 by mating threads 44 on the two members.

The travel of the piston 32 within the cylinder 20 is limited to a short distance by the shoulders 22 and 40 on either end of the cylinder 30.

In operation, the apparatus 5 of this invention is screwed into a hole in a flow pipe or cut-off valve 46, as shown in FIG. 2. The standpipe 38 is filled with the desired fluid through a bleed off valve (not shown) or fitting commonly found on such gauges.

The desired fluid is forced into the gauge and standpipe 38 which forces the piston 32 to seat against the shoulder 22 on the bushing 10, and a very small quantity of this fluid finds its way between the piston 32 and cylinder wall 30 to lubricate them and serve as a seal therebetween. In some cases, it may be necessary to calibrate the gauge to "0" PSI with positive pressure in the gauge and standpipe from the fluid contained.

When drilling mud or other fluid passes through the flow pipe 46, the pressure in the flow pipe is transmitted through the piston 32 to the fluid in the standpipe 38 and the gauge 50. Since fluids have a very limited compressibility, only slight movement of the piston 32 is required to transmit pressure fluctuations. When there is no pressure in the flow pipe 46, the piston 32 is forced down and seats against the shoulder 22 of bushing 10.

While the illustration presented is directed toward problems in the oil industry involving drilling mud and similar fluids and sub-freezing temperatures, it is recognized that a wide range of applications may be made of this device and that any suitable fluids may be used therein. For example, referring to the embodiment of the present invention shown in FIGS. 4 and 5, the apparatus of the present invention may be used in high temperature applications, such as nuclear power and fossil fuel plants where temperatures as high as 1000° F. may be encountered.

Figure 5:
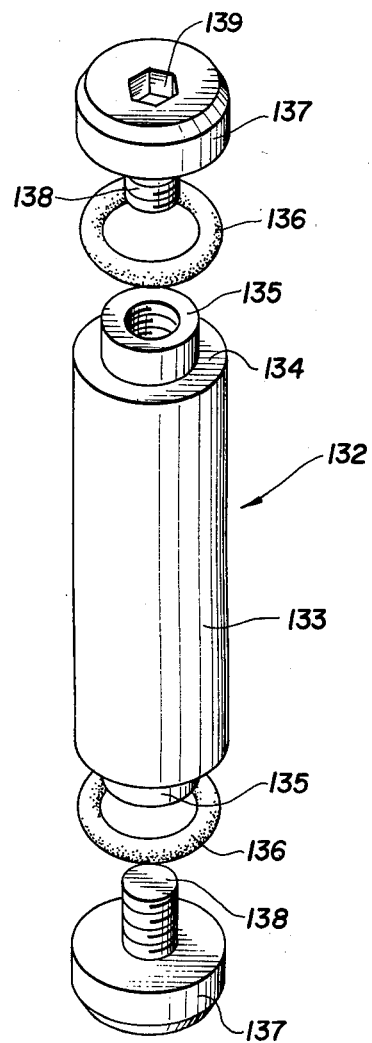
FIG. 5 is an exploded, enlarged view in perspective of the piston of the apparatus shown in FIG. 4.

In the high temperature embodiment shown in FIGS. 4 and 5, the general construction of the piston cylinder 120, the bushing 110 and the standpipe 138 is generally the same or similar to that of the first embodiment of the apparatus shown in FIGS. 1 and 3. The construction of the piston 132, however, is modified to insure the operability of the apparatus in such high temperature environments.

Referring specifically to FIG. 5, the piston 132 comprises a body portion 133 with recessed annular surfaces 134 at the ends thereof, with reduced end portions 135 extending axially outwardly from the annular surfaces 134 and being threaded on the interior surfaces thereof. O-rings 136 formed of a high temperature resistant material are positioned around the end portions 135 and held in engagement with the annular end surfaces 134 by end cap members 137 having threaded bolt portions 138 that are adapted to cooperate with the threads on the interiors of the end portions 135.

The end cap members 137 may be constructed in any suitable manner so as to enable them to be threaded onto the end portions 135 to compress or hold in place the gaskets 136 between the end caps and the annular end surfaces 134. For example, each end cap 137 may be provided with a hexagonal recess 139 or the like which is adapted to receive an Allen wrench or the like to facilitate the tightening of each end cap 137 onto the end portions 135 of the piston 132.

In accordance with the teachings of the present invention, the O-rings preferably are formed of Grafoil. The novel construction of the piston 132 and the use of Grafoil O-rings 136 enables the second embodiment of the apparatus of the present invention shown in FIGS. 4 and 5 to function in high temperature environments such as those encountered in nuclear power plants, fossil fuel plants and the like.

What is claimed is:

1. Apparatus for transferring pressure from a flow line having a first fluid therein to a standby line having one end in communication with said flow line, said standby line having a closed column of a second fluid and a pressure indicating means therein, said apparatus comprising a piston mounted for axial movement in said standby line when subjected to pressure, said piston being disposed between said flow line and said indicating means, said standby line comprising a sleeve having said piston mounted therein, means for limiting the axial movement of said piston in said sleeve, the diameter of said piston being slightly less than the inside diameter of said sleeve, and sealing means disposed between said piston and said sleeve, whereby pressure in said flow line is transferred to said piston to effect limited movement thereof and to subject said second fluid and said fluid indicating means to said pressure, said piston having circumferential bores therein near the ends thereof, and said sealing means comprising O-rings mounted in said bores, said O-rings being formed of a material that can withstand temperatures up to 1000° F.

2. The apparatus of claim 1 wherein said second fluid is a non-freezing fluid.

3. The apparatus of claim 1 wherein said piston is formed of stainless steel.

4. The apparatus of claim 1 wherein said piston has an outer diameter that is approximately one-two thousandth of an inch less than the inside diameter of said sleeve.

5. The apparatus of claim 1 wherein said O-rings are formed of Grafoil for high temperature environments.

6. The apparatus of claim 1 wherein said bores are defined by reduced end portions of said piston, and end caps are removably mounted on said end portions and engageable with said O-rings to maintain them in place in said bores.

7. The apparatus of claim 6 wherein said end portions have threaded end openings, and said end caps have threaded portions that are receivable in said end openings.

* * * * *